Patented July 22, 1924.

1,502,076

UNITED STATES PATENT OFFICE.

MORIZ WEINRICH, OF NEW YORK, N. Y.; DOROTHEA JOSEPHINE ELIZABETH WEINRICH EXECUTRIX OF SAID MORIZ WEINRICH, DECEASED.

METHOD OF REVIVIFYING CARBONACEOUS FILTERING MEDIUMS.

No Drawing. Application filed November 29, 1920. Serial No. 427,139.

*To all whom it may concern:*

Be it known that I, MORIZ WEINRICH, a citizen of the United States, residing at New York city, in the county of New York and State of New York, have invented certain new and useful Improvements in Methods of Revivifying Carbonaceous Filtering Mediums, of which the following is a specification.

My invention relates to a process of revivifying carbonaceous filtering mediums, and the object of the present invention is to provide a new and improved process by which these filtering mediums may be revivified in a simple, and inexpensive manner, and thereby adapted for further use.

In my U. S. Patent No. 1,308,826, issued July 8, 1919, for method of manufacturing carbonaceous filtering mediums, I have described the manufacturer of granular as well as of finely divided carbonaceous filtering mediums. The granular materials can be revivified in the same way as granular boneblack, while the revivification of finely divided materials, whatever their origin may be, boneblack or carbons with more or less ash contents, is very troublesome and expensive. These finely divided chars are generally used in connection with filter presses and I have found a way of revivifying same in a simple and inexpensive way in the filter presses proper, so that they can be used again in their moist state as soon as they have been discharged from the presses.

In carrying out my invention the mode of operation would be as follows:

In one or more tanks provided with stirrers and steam-jackets or steam-coils, the solutions to be purified shall be mixed with the finely divided filtering materials, and kept in contact for 30 to 40 minutes by means of the stirrers and at the desired temperature by means of the steam-jackets or coils. These tanks shall be placed on a floor 15 to 20 feet above the filter presses, so that the presses can be filled by gravity. The ordinary frame filter presses with frames of 1 to 1½ inch thickness and so constructed that the cakes formed in the frames can be washed, are best adapted for this process. As soon as all the frames have been filled and the purified solution has run out, boiling water from a tank standing on the same floor as the supply or mixing tanks, is turned on and the cakes which have formed in the frames are first sweetened off and then washed until the escaping water is colorless. When this point has been reached the wash-water is turned off and the purification or revivification of the material begins. For this purpose a closed tank is placed on the same floor as the other mentioned tanks, this tank containing boiling water to which sufficient ammonia hydrate (aqua ammonia) is added so that it shows a density of about one degree Baumé. This solution now follows the pure washwater and by penetrating the cakes of the filtering material it will dissolve and remove the remaining color and impurities.

The water running off will show considerable color at first, which will gradually lighten, and as soon as this color has disappeared altogether, the ammonia water is stopped and boiling water from the pure water tank is again turned on in order to remove the remaining ammonia water from the cakes. As soon as the ammonia is removed the flow of pure water is stopped, and compressed air is now turned on and passed through the cakes to remove a part of the water left in the cakes.

When this has been accomplished the presses with the revivified material are emptied into their hoppers under which wagons shall be run into which the material falls. These wagons are elevated upon the upper floor and emptied into the mixing tanks where the material is again used. It is well known that the condense water of the second, third and fourth effects of multiple effects is beet and cane sugar factories, and also in sugar refineries, contains some ammonia which runs to waste. This condense water, to which additional ammonia has been added to obtain the desired density, may be used to good effect with this process and the working expense thereby lessened.

In case very dark and impure solutions, as for instance molasses, are to be treated by the filtering materials, it is advisable to discard a small percentage of the material after each use, and replace it by new material, thus keeping the efficiency of the materials at their highest point.

Instead of filter presses, other suitable apparatus may be used in the same way with this process, as for instance bag filters, but I generally prefer the use of filter presses because the thin cakes in the filter presses offer a much larger surface than the contents of filter bags, and are therefore purified much quicker and with less ammonia.

It is well known that the use of ammonia solutions has been tried before in the revivification of carbonaceous filtering mediums, as I have mentioned in my U. S. Patent No. 1,308,826, but not in the novel and improved way I have specified above.

Having thus described my invention what I claim as new and desire to secure by Letters Patent is:

The method of revivifying vegetable carbon after it has been kept in contact with solutions to be purified and thereafter run into filter presses, and while it remains in the presses, which consists in first washing the carbon cakes with hot water until the escaping water is colorless, then washing the cakes with a hot ammonia solution thereby freeing the remaining color and impurities from the cakes, then again washing the cakes with hot water to remove the remaining ammonia solution from the cakes, then subjecting the cakes to compressed air to partly dry the same, and finally discharging the revivified carbon from the presses.

In testimony whereof I hereunto affix my signature.

MORIZ WEINRICH.